United States Patent
Li et al.

(10) Patent No.: US 11,994,686 B2
(45) Date of Patent: May 28, 2024

(54) COMPUTING DEVICE WITH LIVE BACKGROUND AND RELATED METHOD

(71) Applicant: CITRIX SYSTEMS, INC., Fort Lauderdale, FL (US)

(72) Inventors: Qiming Li, Nanjing (CN); Dai Li, Nanjing (CN); Zhenxing Liu, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 153 days.

(21) Appl. No.: 17/647,092

(22) Filed: Jan. 5, 2022

(65) Prior Publication Data

US 2023/0161168 A1   May 25, 2023

Related U.S. Application Data

(63) Continuation of application No. PCT/CN2021/133070, filed on Nov. 25, 2021.

(51) Int. Cl.
| | | |
|---|---|---|
| *G02B 27/01* | (2006.01) | |
| *G02B 27/00* | (2006.01) | |
| *G06F 3/04817* | (2022.01) | |
| *G06T 19/00* | (2011.01) | |

(52) U.S. Cl.
CPC ..... *G02B 27/0179* (2013.01); *G02B 27/0093* (2013.01); *G02B 27/017* (2013.01); *G06F 3/04817* (2013.01); *G06T 19/006* (2013.01); *G02B 2027/0138* (2013.01); *G02B 2027/014* (2013.01); *G02B 2027/0187* (2013.01)

(58) Field of Classification Search
CPC .............. G06F 3/04817; G06T 19/006; G02B 27/0179; G02B 27/0093; G02B 27/017; G02B 2027/0138; G02B 2027/014; G02B 2027/0187; G09G 2354/00; G09G 5/003; G09G 5/14; G09G 2320/103; G09G 2340/125; G09G 2340/14; G09G 5/026; G09G 2340/12; G09G 2370/20
See application file for complete search history.

(56) References Cited

U.S. PATENT DOCUMENTS

| | | | |
|---|---|---|---|
| 8,922,666 B2 * | 12/2014 | Oshima ................... | H04N 23/64 |
| | | | 348/211.99 |
| 9,047,703 B2 | 6/2015 | Beckwith et al. | |
| 9,064,420 B2 | 6/2015 | Beckwith et al. | |
| 9,444,924 B2 * | 9/2016 | Rodriguez .............. | G06F 18/00 |
| 9,773,346 B1 * | 9/2017 | Baldwin ............... | G06F 3/0304 |
| 9,846,999 B1 | 12/2017 | Pickover et al. | |
| 9,881,503 B1 | 1/2018 | Goldman-Shenhar et al. | |
| 9,911,395 B1 | 3/2018 | Townsend et al. | |

(Continued)

OTHER PUBLICATIONS

Adrianisen How To Use Your Camera As Live Wallpaper On Samsung Galaxy S8 Review! https://www.youtube.com/watch?v=IN1OI2SSfAo.

*Primary Examiner* — Benyam Ketema

(57) ABSTRACT

A computing device includes an image sensor, an IMU, a display, and a processor coupled to the image sensor, the IMU, and the display. The processor is configured to generate a GUI current screen on the display. The GUI current screen includes a background, and foreground GUI elements overlaying the background. The processor is configured to when the IMU generates motion data indicative of movement, render the background to comprise a video image from the image sensor.

12 Claims, 12 Drawing Sheets

(56) References Cited

U.S. PATENT DOCUMENTS

| | | | |
|---|---|---|---|
| 10,034,066 B2 | 7/2018 | Tran et al. | |
| 10,181,219 B1* | 1/2019 | Murphy | A63F 13/26 |
| 10,250,948 B1* | 4/2019 | Bortz | G06T 11/60 |
| 10,262,471 B2 | 4/2019 | Kislovskiy et al. | |
| 10,928,898 B2 | 2/2021 | Young et al. | |
| 11,163,417 B2* | 11/2021 | Hauenstein | G06F 3/04815 |
| 2011/0037712 A1* | 2/2011 | Kim | G06F 3/0488 |
| | | | 345/173 |
| 2011/0216002 A1* | 9/2011 | Weising | A63F 13/92 |
| | | | 345/158 |
| 2012/0008931 A1* | 1/2012 | Lee | H04N 23/63 |
| | | | 396/287 |
| 2012/0050141 A1* | 3/2012 | Border | G02B 27/01 |
| | | | 345/8 |
| 2012/0113223 A1* | 5/2012 | Hilliges | G06F 3/011 |
| | | | 348/46 |
| 2012/0116728 A1* | 5/2012 | Shear | G06F 30/00 |
| | | | 703/1 |
| 2012/0146998 A1* | 6/2012 | Kim | G06T 19/006 |
| | | | 345/419 |
| 2012/0154441 A1* | 6/2012 | Kim | G08G 1/09623 |
| | | | 345/633 |
| 2013/0083061 A1* | 4/2013 | Mishra | A63F 13/803 |
| | | | 345/633 |
| 2013/0234926 A1* | 9/2013 | Rauber | G06F 3/04817 |
| | | | 345/156 |
| 2013/0257907 A1* | 10/2013 | Matsui | G06T 7/74 |
| | | | 345/633 |
| 2014/0047340 A1* | 2/2014 | Ravi | G06F 3/0484 |
| | | | 715/720 |
| 2014/0104316 A1* | 4/2014 | Sharma | G06F 1/1626 |
| | | | 345/633 |
| 2014/0225919 A1* | 8/2014 | Kaino | H04N 7/183 |
| | | | 345/633 |
| 2014/0244160 A1* | 8/2014 | Cragun | G01C 21/20 |
| | | | 701/436 |
| 2014/0267410 A1* | 9/2014 | Fein | G06Q 30/0641 |
| | | | 345/633 |
| 2014/0282220 A1* | 9/2014 | Wantland | G06F 3/011 |
| | | | 715/782 |
| 2014/0285404 A1* | 9/2014 | Takano | G06F 3/04812 |
| | | | 345/8 |
| 2014/0368426 A1* | 12/2014 | Umehara | G06T 15/20 |
| | | | 345/156 |
| 2015/0234456 A1* | 8/2015 | Cho | G02B 27/0172 |
| | | | 345/156 |
| 2015/0253862 A1* | 9/2015 | Seo | G06F 3/017 |
| | | | 715/863 |
| 2015/0294506 A1* | 10/2015 | Bare | H04W 4/029 |
| | | | 345/633 |
| 2015/0356786 A1* | 12/2015 | Bare | G01R 31/3274 |
| | | | 345/633 |
| 2015/0363966 A1* | 12/2015 | Wells | G06F 3/04815 |
| | | | 345/419 |
| 2016/0019721 A1* | 1/2016 | Bare | G06T 19/006 |
| | | | 345/633 |
| 2016/0093207 A1 | 3/2016 | Di Censo et al. | |
| 2016/0148433 A1* | 5/2016 | Petrovskaya | G02B 27/01 |
| | | | 345/633 |
| 2016/0210752 A1 | 7/2016 | Ratcliff et al. | |
| 2016/0253844 A1* | 9/2016 | Petrovskaya | G06Q 50/01 |
| | | | 345/633 |
| 2016/0292720 A1 | 10/2016 | Wooden | |
| 2017/0010468 A1 | 1/2017 | Deering et al. | |
| 2017/0032559 A1* | 2/2017 | Chao | G06F 3/013 |
| 2017/0061694 A1* | 3/2017 | Giraldi | G06F 3/16 |
| 2017/0069122 A1* | 3/2017 | Lee | G06T 11/60 |
| 2017/0249745 A1* | 8/2017 | Fiala | A63F 13/65 |
| 2017/0315608 A1* | 11/2017 | Shanware | G02B 27/01 |
| 2018/0053338 A1* | 2/2018 | Khademolhosseini | |
| | | | G06T 15/205 |
| 2018/0154853 A1* | 6/2018 | Thieberger | G06F 3/011 |
| 2018/0176483 A1* | 6/2018 | Knorr | H04N 5/2723 |
| 2018/0231772 A1* | 8/2018 | Han | G02B 27/0101 |
| 2018/0299284 A1 | 10/2018 | Wang | |
| 2018/0330544 A1* | 11/2018 | Corso | G06T 19/006 |
| 2019/0065027 A1* | 2/2019 | Hauenstein | G06F 3/014 |
| 2019/0228589 A1* | 7/2019 | Dascola | G06T 7/70 |
| 2019/0279407 A1* | 9/2019 | McHugh | G06F 3/011 |
| 2019/0294895 A1* | 9/2019 | Kleen | G02B 27/01 |
| 2020/0042098 A1* | 2/2020 | Joo | G06F 3/017 |
| 2020/0051337 A1* | 2/2020 | Reynolds | G06T 11/60 |
| 2020/0258144 A1* | 8/2020 | Chaturvedi | G06T 7/50 |
| 2020/0258481 A1* | 8/2020 | Woo | G02B 27/017 |
| 2021/0092555 A1* | 3/2021 | Mayor | G06V 10/806 |
| 2021/0125411 A1* | 4/2021 | Choi | G06F 3/1423 |

* cited by examiner

COMPUTING DEVICE WITH LIVE BACKGROUND AND RELATED METHOD

RELATED APPLICATIONS

This application is a continuation of PCT application serial no. PCT/CN2021/133070 filed Nov. 25, 2021, which is hereby incorporated herein in its entirety by reference.

TECHNICAL FIELD

The present disclosure relates to computing devices, and more particularly, to a graphical user interface for computing devices.

BACKGROUND

Mobile devices have become ubiquitous in modern times. Since mobile devices can be engrossing, easily absorbing a user's complete attention, there have been efforts to mitigate safety risks when the user is multitasking. For example, some mobile devices detect when the user is traveling within a motor vehicle and will warn the user, and/or disable functionality to encourage the user to pay complete attention to the motor vehicle.

In typical metropolitan areas, it is not uncommon to see many people walking about with their attention firmly devoted to a mobile device. Further, it is not uncommon for pedestrians to walk into traffic or trip on sidewalks while using their mobile devices. Indeed, in some high traffic areas, some municipalities have placed signs encouraging pedestrians to keep their attention forward and away from the mobile device. Because of this, there has been general concern for pedestrian safety for users walking while using their mobile device. The issue has grown to such a level that government interest in pedestrian safety has increased. See, e.g., Scopatz, R. A. & Zhou, Y. (2016, April), Effect of electronic device use on pedestrian safety: A literature review (Report No. DOT HS 812 256). Washington, DC: National Highway Traffic Safety Administration.

SUMMARY

Generally, a computing device includes an image sensor, an inertial measurement unit (IMU), a display, and a processor coupled to the image sensor, the IMU, and the display. The processor is configured to generate a graphical user interface (GUI) current screen on the display. The GUI current screen comprises a background, and a plurality of foreground GUI elements overlaying the background. The processor is configured to when the IMU generates motion data indicative of movement, render the background to comprise a video image (e.g. live video image) from the image sensor.

Further, the processor may be configured to, when the IMU generates the motion data indicative of movement and when user input is detected, render the background to comprise the video image from the image sensor. The computing device may further include a flash device adjacent the image sensor, and the processor may be configured to, when the IMU generates the motion data indicative of movement and when ambient illumination is less than a threshold, activate the flash device and render the background to comprise the video image from the image sensor. The processor may be configured to render the background to comprise the video image from the image sensor until a set time period expires.

For example, the GUI current screen may comprise a chat application interface. The background may comprise a chat interface background, and the plurality of foreground GUI elements may comprise chat textual elements. The GUI current screen may comprise a home screen interface. The background may comprise a home screen background, and the plurality of foreground GUI elements may comprise application icons.

Also, the computing device may further comprise a housing carrying the image sensor, the IMU, the display, and the processor, and the image sensor may be carried by a major surface of the housing, the major surface being opposite the display. The motion data indicative of movement may comprise motion data indicative of at least one of walking and running.

Another aspect is directed to a method of operating a computing device comprising an image sensor, an IMU, and a display. The method comprises operating a processor coupled to the image sensor, the IMU, and the display, to generate a GUI current screen on the display. The GUI current screen includes a background, and a plurality of foreground GUI elements overlaying the background. The method comprises operating the processor to, when the IMU generates motion data indicative of movement, render the background to comprise a video image from the image sensor.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
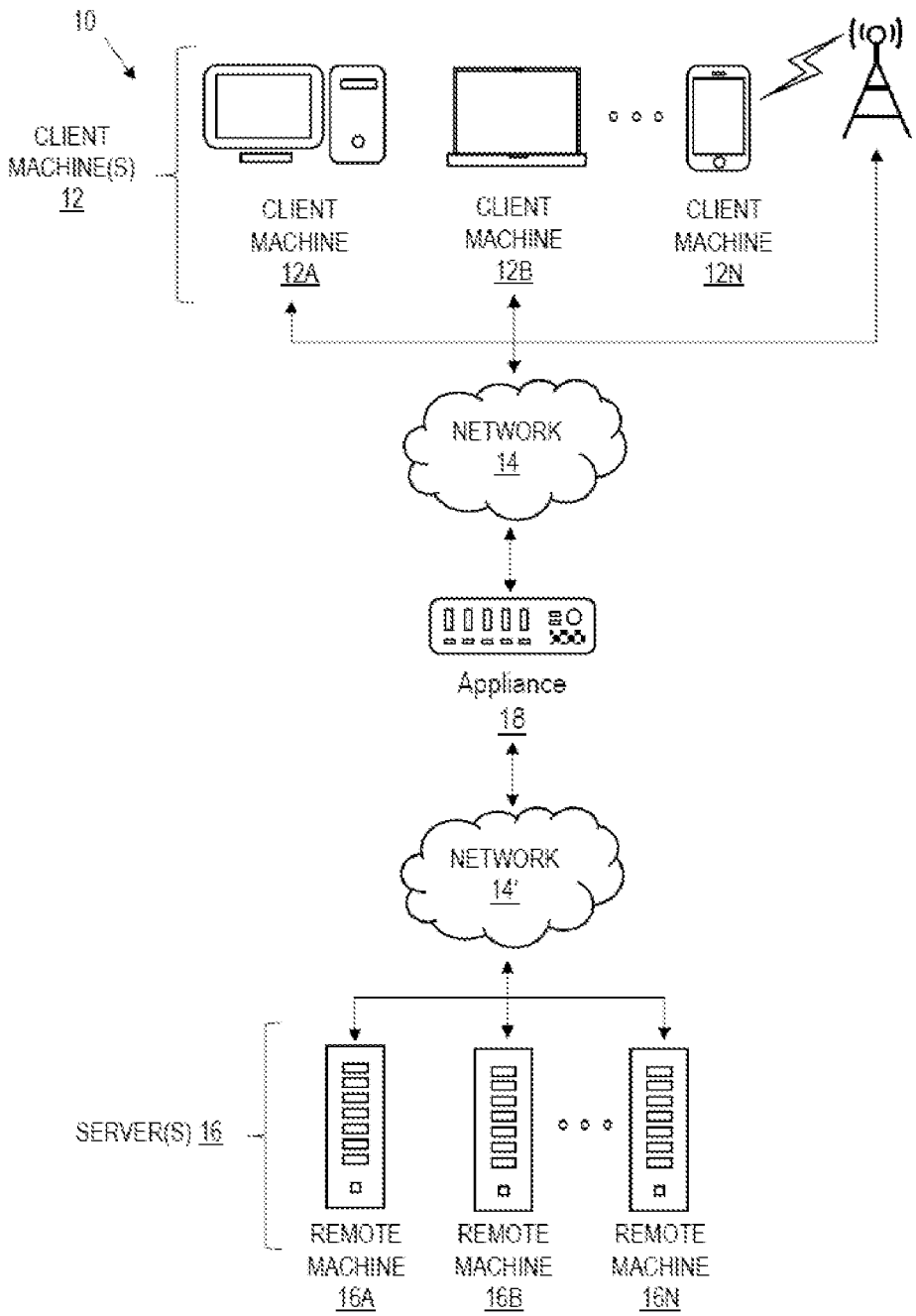
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 18 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
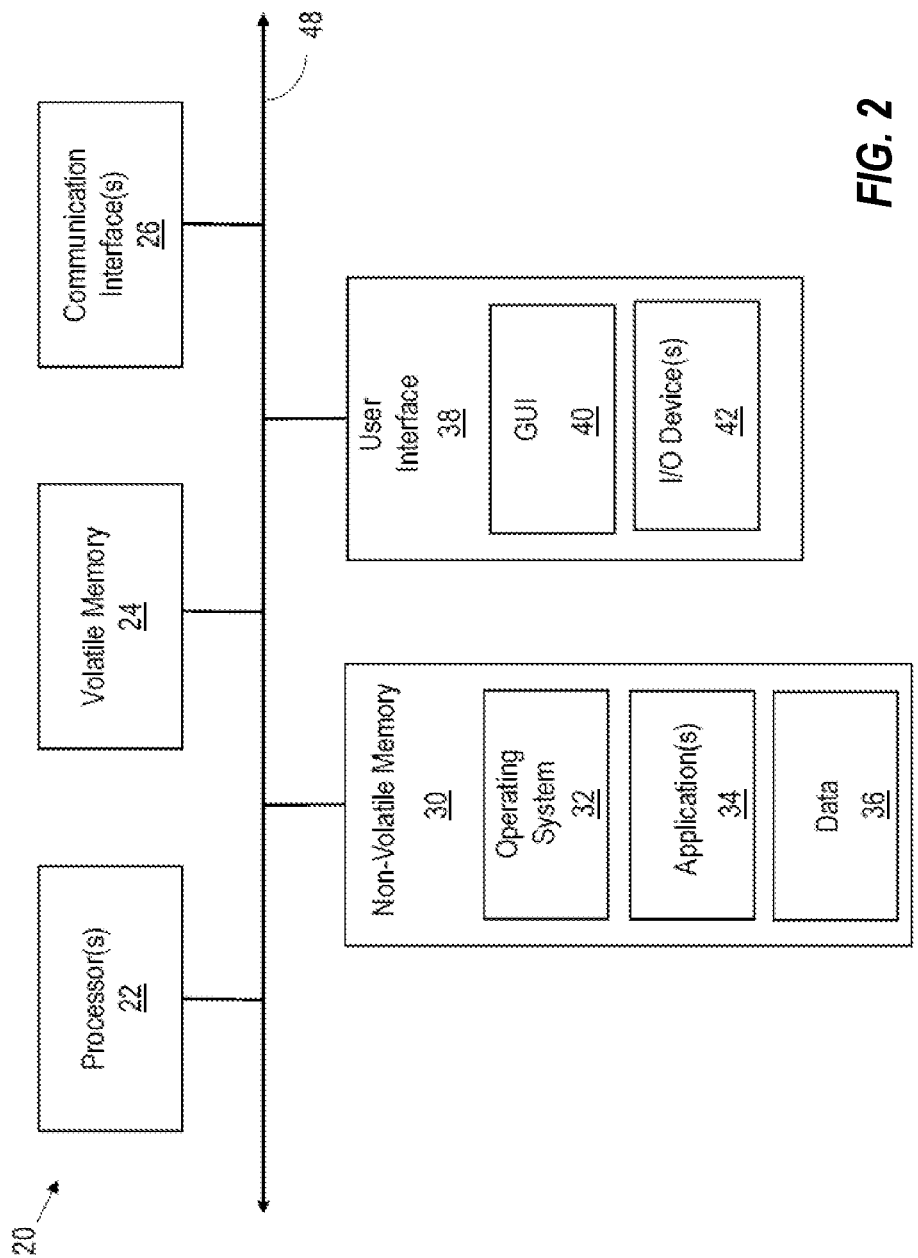
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a GUI 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Florida ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
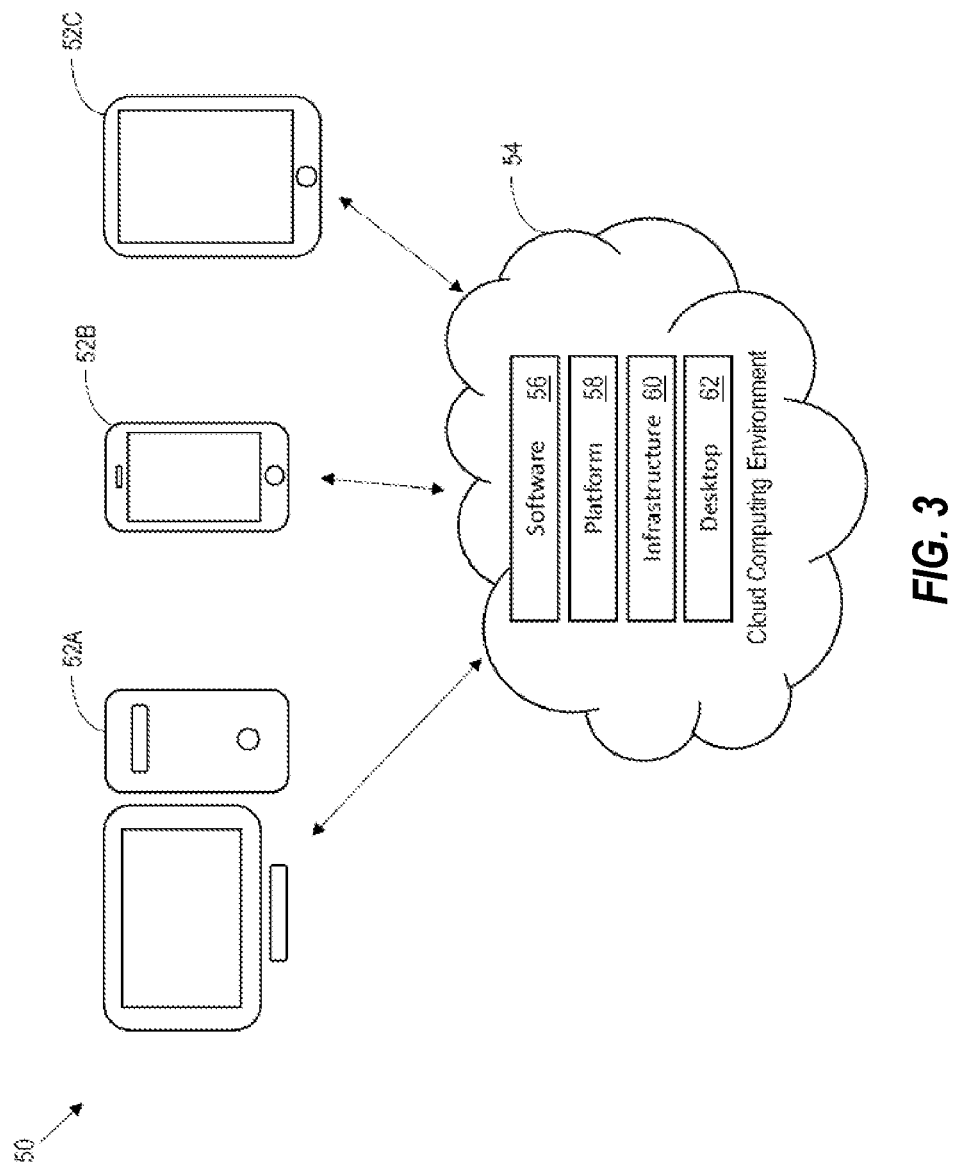
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft ONE-DRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4:
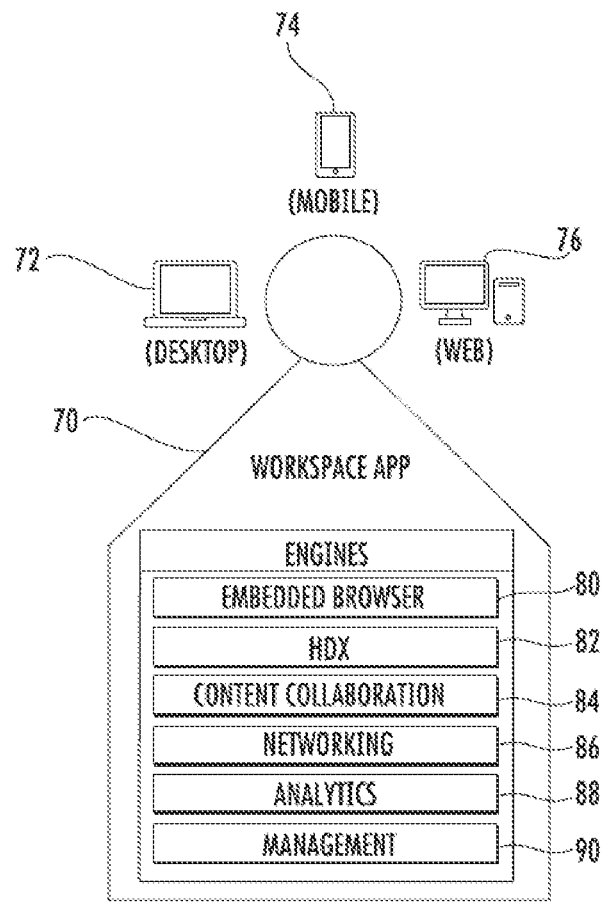
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
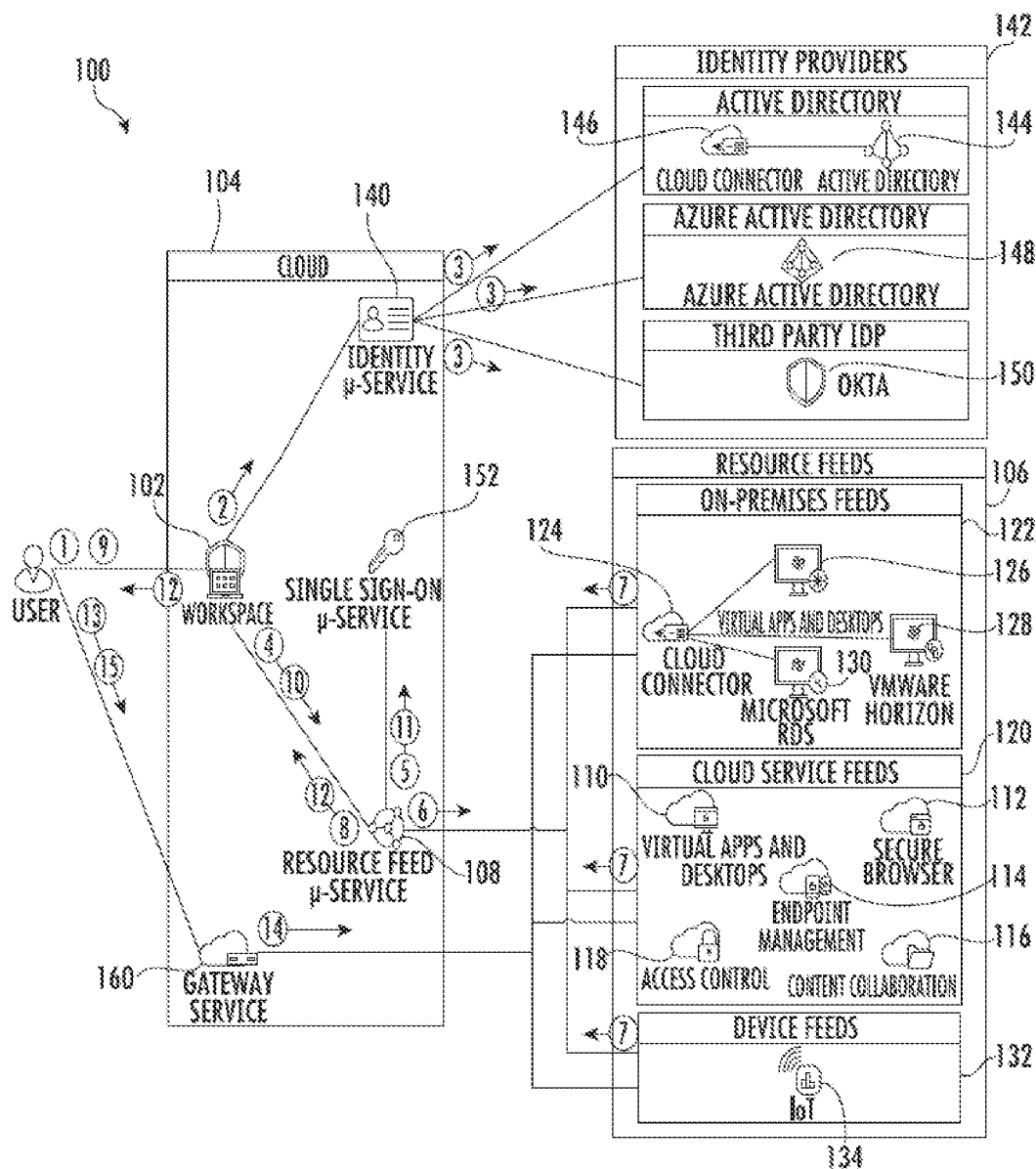
FIG. 5 is a schematic block diagram of a workspace network environment of computing devices in which various aspects of the disclosure may be implemented.
Figure 6:
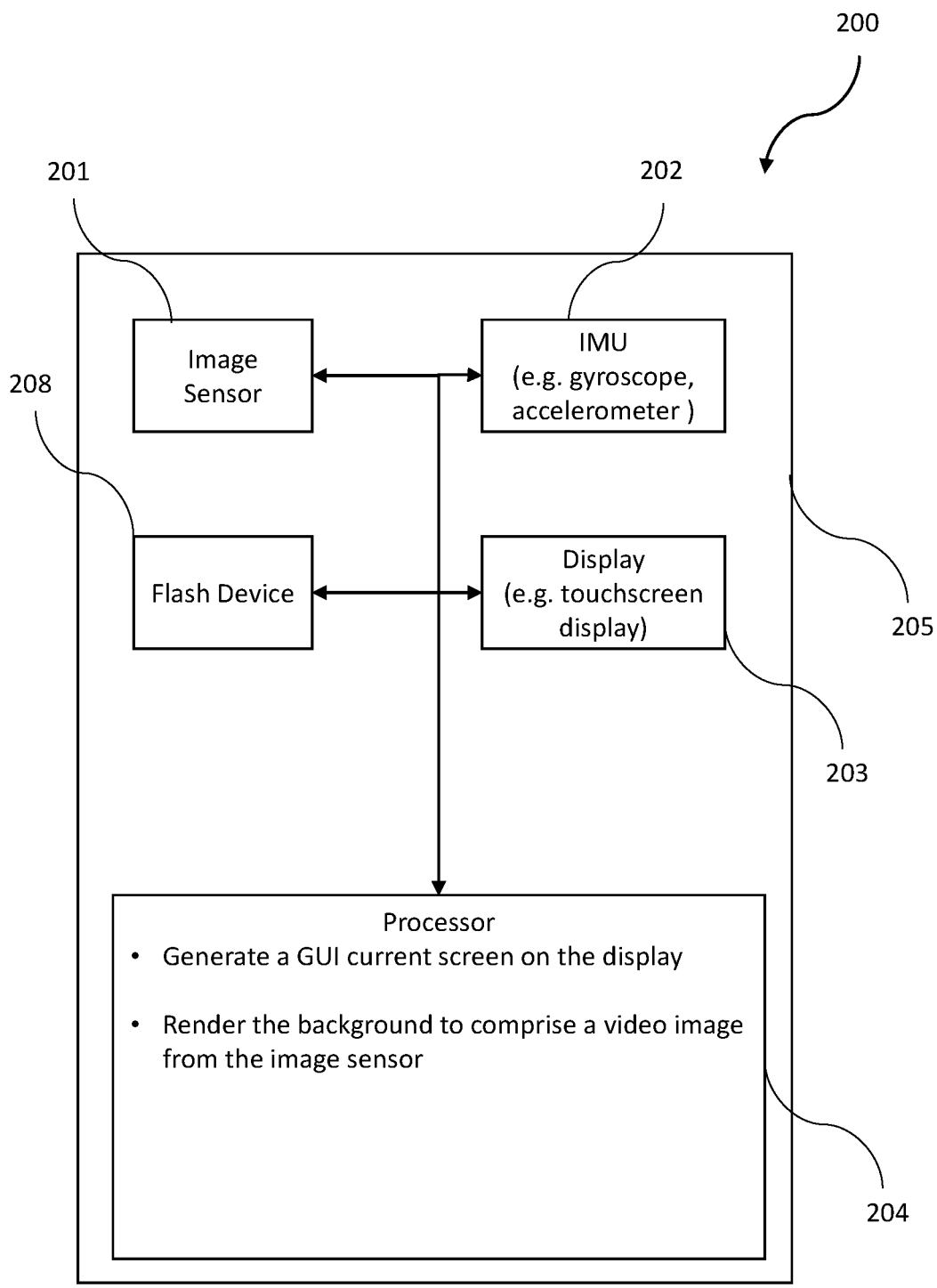
FIG. 6 is a schematic block diagram of a computing device in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11).

The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

As discussed above, pedestrian safety due to distracted pedestrians using computing devices has become a problem. Although there have been some approaches to warn users not to dangerously multitask, these may not dissuade stubborn users from engaging in unsafe behavior. Besides the danger of distracted pedestrians on metropolitan streets, there is also risk while walking around buildings and navigating staircases. In the following, an approach to these problems is described.

Referring now additionally to FIGS. 6, 7A-7B, and 8A-8B, a computing device 200 according to the present disclosure is now described. The computing device 200 includes an image sensor 201, an IMU 202, a display 203, and a processor 204 coupled to the image sensor, the IMU, and the display. The computing device 200 may comprise a mobile cellular device, a tablet computing device, or any portable computing device, for example.

In some embodiments, the display 203 may comprise a touchscreen display configured to receive touch user input. Also, the computing device 200 further comprises a housing 205 carrying the image sensor 201, the IMU 202, the display 203, and the processor 204. As will be appreciated, in some embodiments utilizing the "black slab" form factor, the housing 205 comprises a first major surface, and a second major surface opposite the first major surface. The display 203 is carried by the first major surface, which faces a user, and the image sensor 201 is carried by the second major surface of the housing, the second major surface being opposite the display (i.e. the rear facing image sensor on the backside of the computing device 200). The computing device 200 further includes a flash device 208 adjacent the image sensor 201 and also carried on the second major surface of the housing 205.

Figure 7A:
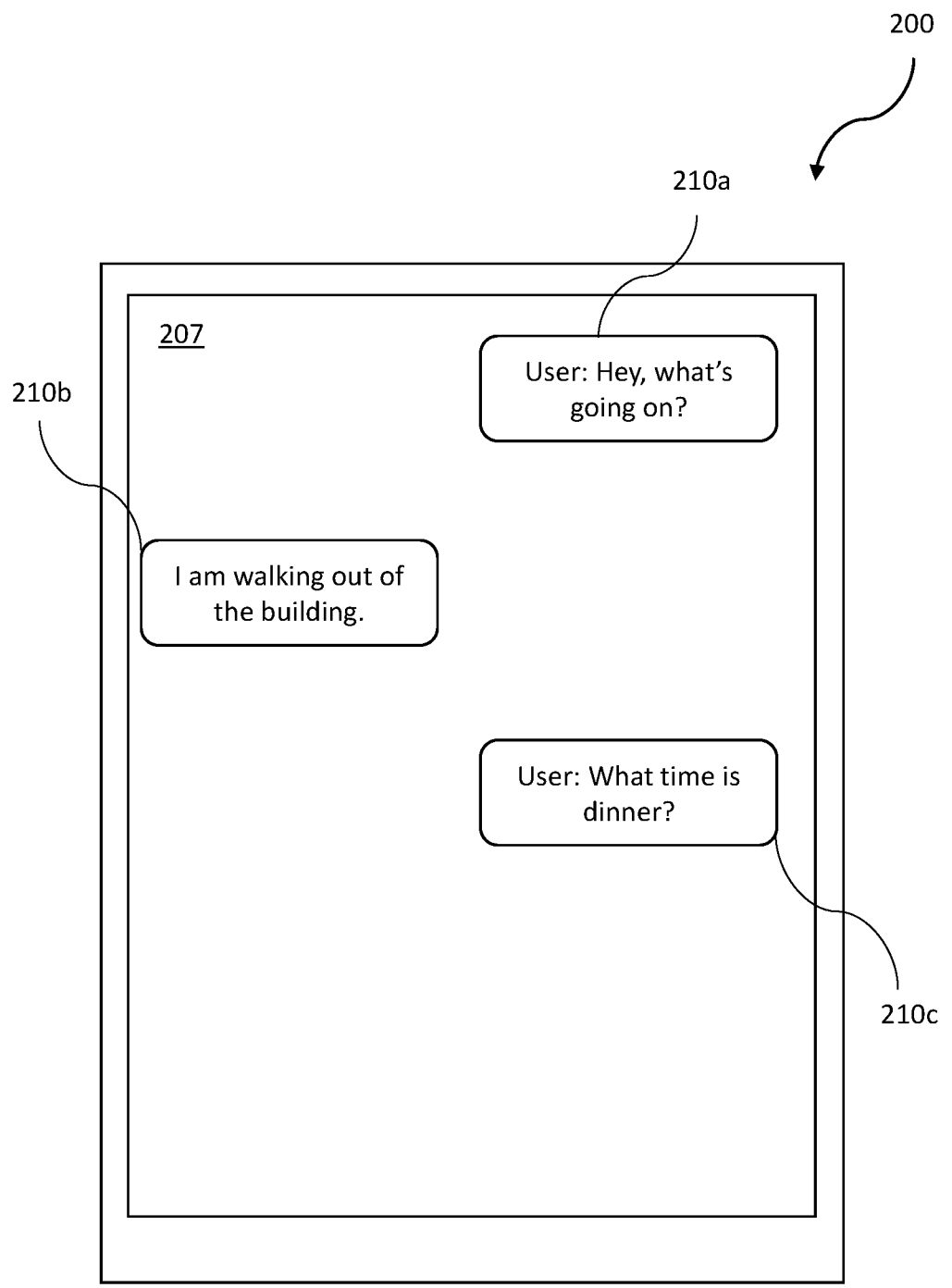
FIGS. 7A and 7B are schematic diagrams of the computing device of FIG. 6 with an original chat interface background and a replaced chat interface background, respectively.
Figure 7B:
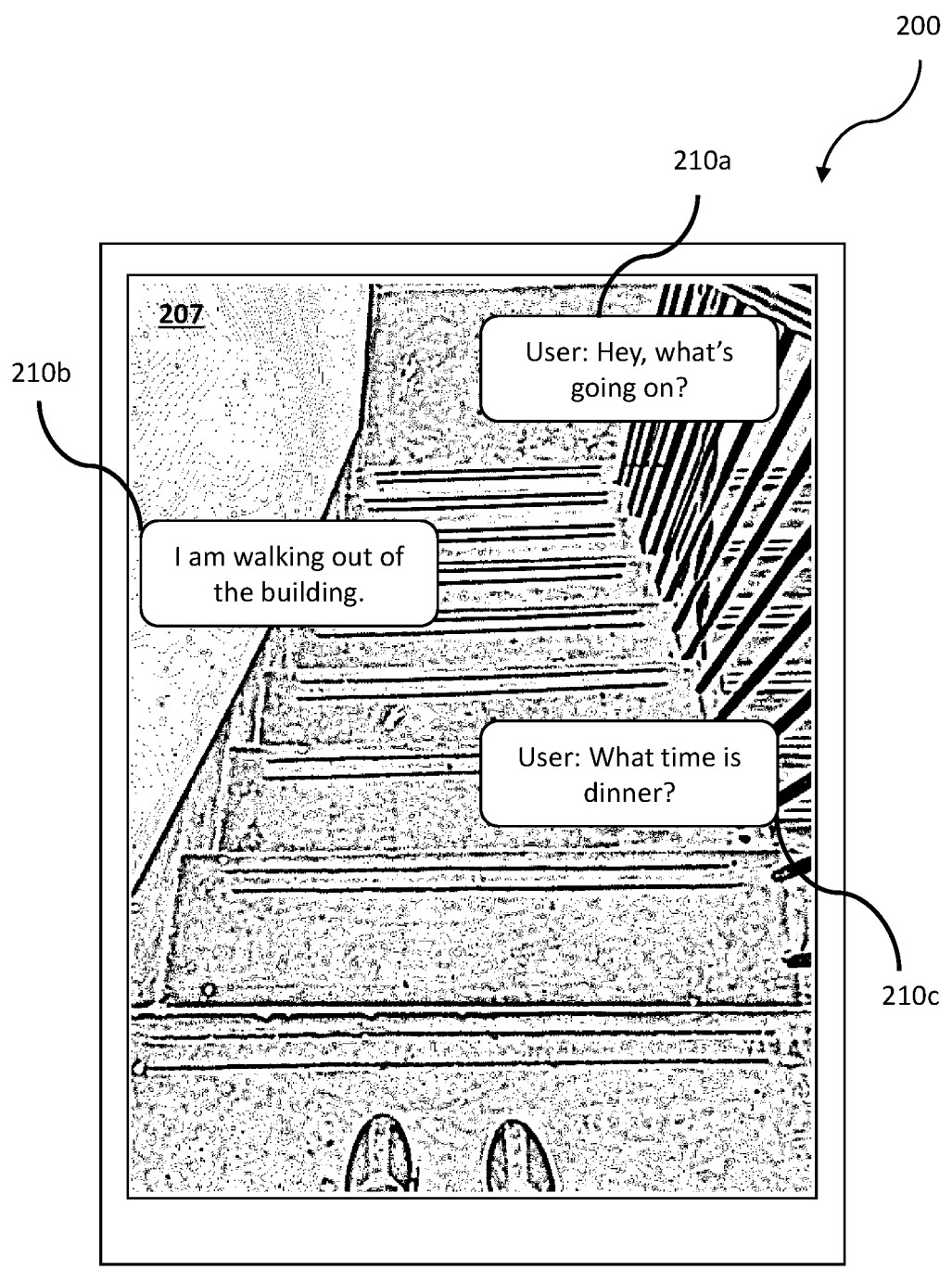
Figure 8A:
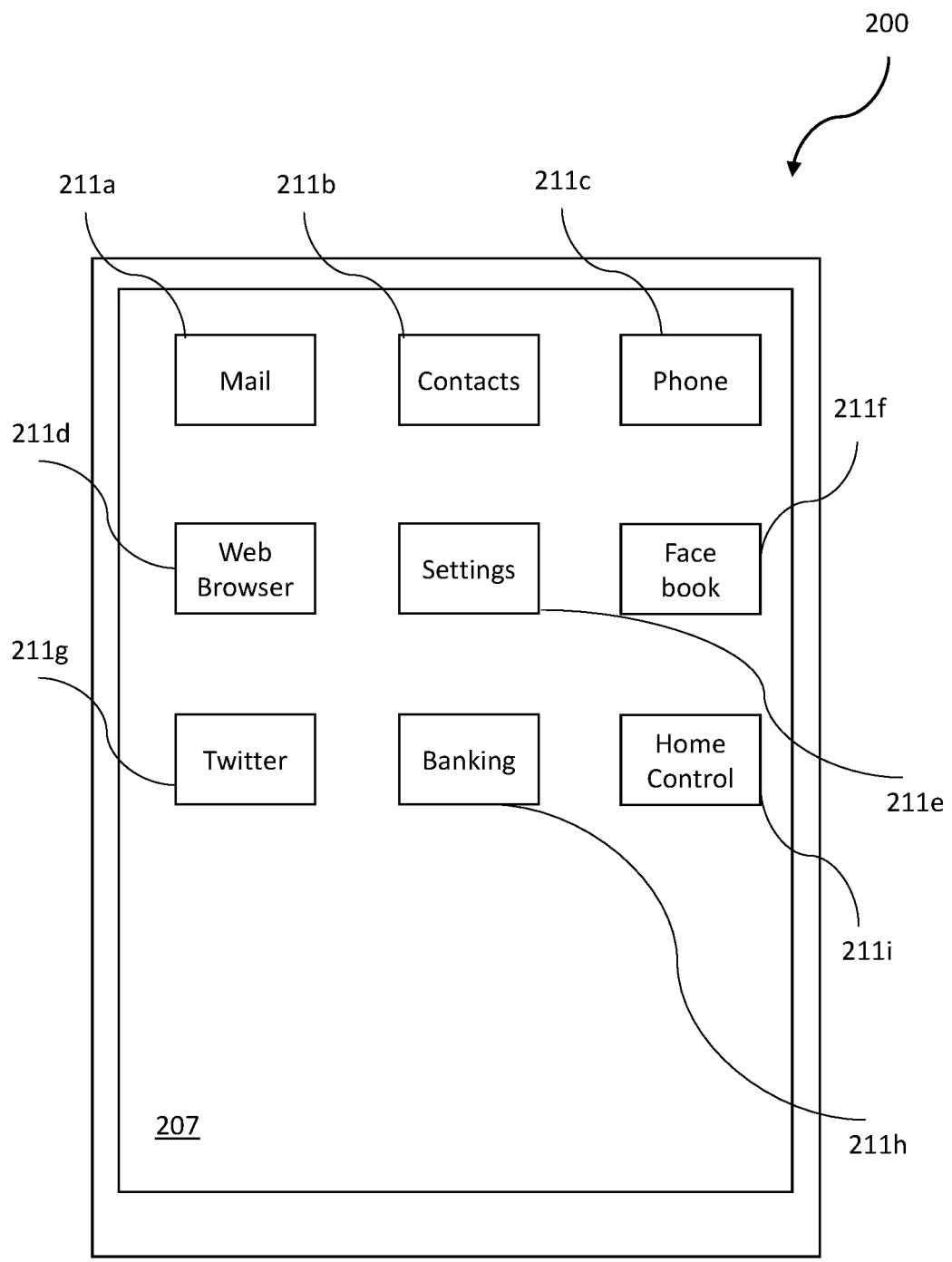
FIGS. 8A and 8B are schematic diagrams of the computing device of FIG. 6 with an original home screen interface background and a replaced home screen interface background, respectively.
Figure 8B:
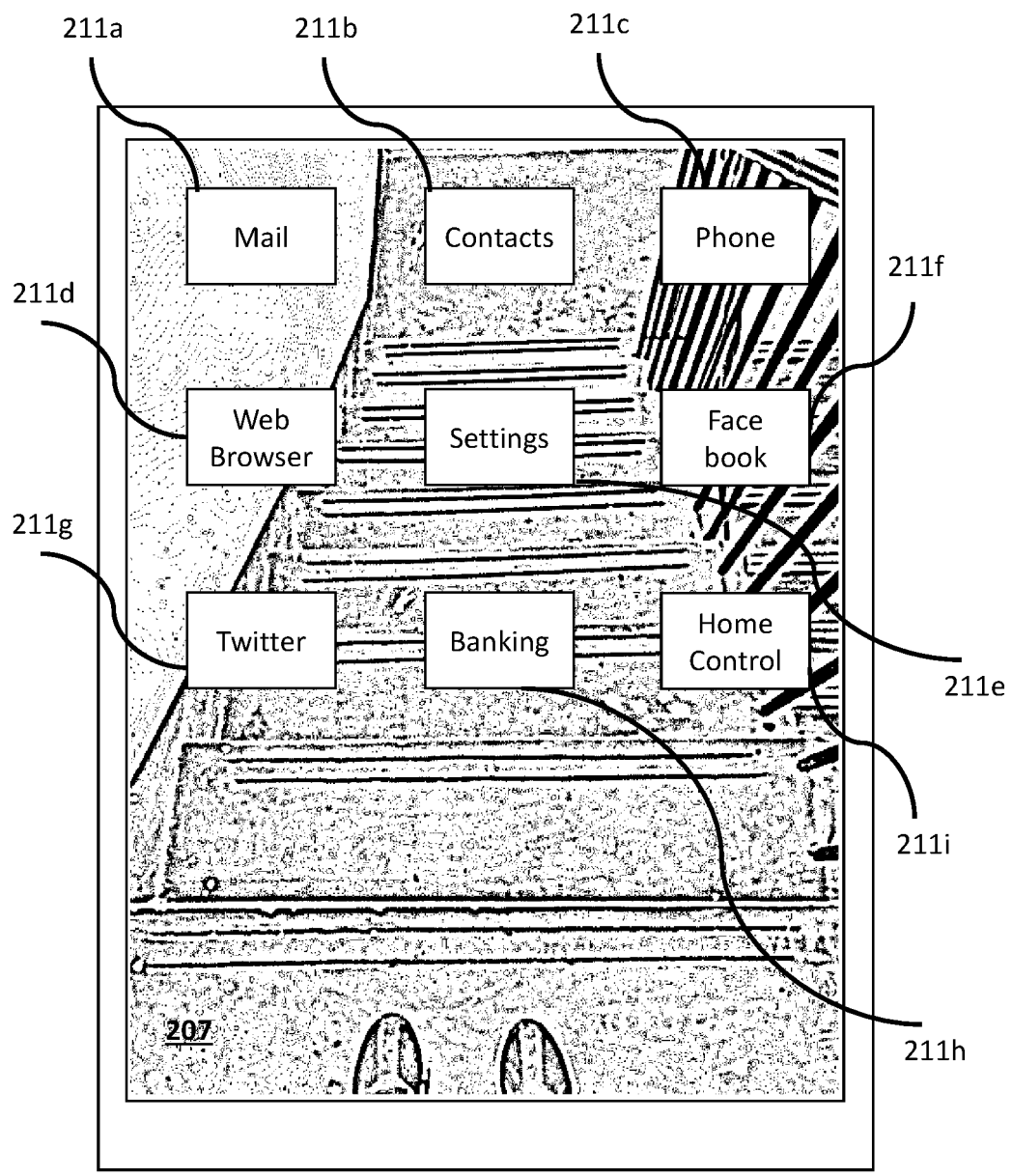

As perhaps best seen in FIGS. 7A and 8A, the processor 204 is configured to generate a GUI current screen 206 on the display 203. The GUI current screen 206 illustratively includes a background 207, and a plurality of foreground GUI elements 210a-210c, 211a-211i overlaying the background. In FIG. 7A, the GUI current screen 206 illustratively comprises a chat application interface, for example, Microsoft Teams or Skype, WeChat, or WhatsApp. Here, the background 207 comprises a chat interface background, and the plurality of foreground GUI elements comprises chat textual elements 210a-210c (i.e. text messages between users). In FIG. 8A, the GUI current screen 206 illustratively comprises a home screen interface. Here, the background 207 comprises a home screen background (i.e. background of the OS), and the plurality of foreground GUI elements comprises application icons 211a-211i.

The IMU 202 may comprise one or more of a gyroscope, an accelerometer, and an altitude sensor. The IMU 202 is configured to generate motion data related to the computing device 200. The motion data may comprise three-dimensional motion data, i.e. speed motion values in three-dimensions. The motion data may also comprise computing device orientation data, such as pitch, yaw, and roll values for the computing device 200.

The processor 204 is configured to when the IMU 202 generates motion data indicative of movement, render the background 207 to comprise a video image from the image sensor 201. In other words, the processor 204 is configured to replace the original background 207 (i.e. static or limited movement background image (stored live background)) of the GUI current screen 206 with a live video image feed from the image sensor 201. As in the illustrated example, the user is carrying the computing device 200 while navigating a staircase, and the background 207 is replaced with a live image of the staircase.

Helpfully, the user can now virtually see through the computing device 200 while focusing on the GUI current screen 206. For example, in the illustrated example, the user can safely navigate the staircase even though the user's attention is on the computing device 200.

In some embodiments, the processor 204 is configured to, when the IMU 202 generates the motion data indicative of movement and when user input is detected, render the background 207 to comprise the video image from the image sensor 201. In touchscreen embodiments, the user input comprises touch user input, but the user input may be generated via other user input devices, such as a short range radar, a joystick, or a physical key. In short, the processor 204 is configured to detect when a user of the computing device 200 is engaged with the GUI and is moving with the computing device. The motion data indicative of movement may comprise motion data indicative of at least one of walking and running of the user. As will be appreciated by those skilled in the art, the motion data may be processed using typical methods of activity detection.

In other embodiments, the processor 204 is configured to, when the IMU 202 generates the motion data indicative of movement is detected and when a backlight of the display 203 is activated, render the background 207 to comprise the video image from the image sensor 201. Further, in some embodiments, the processor 204 is configured to render the background 207 to comprise the video image from the image sensor 201 further when the IMU 202 generates the motion data indicative of downward orientation. In other words, when the computing device 200 is being used and pointed downward, as is typical when the user is walking and engaging with the computing device.

As noted above, the processor is configured to monitor for a plurality of use characteristics, and condition the rendering of the background 207 to comprise the video image from the image sensor 201 based upon one or more the plurality of use characteristics. The plurality of use characteristics may comprise: active state of display backlight, detection of user input; detection of motion data indicative of movement; and detection of device orientation. In some embodiments, the processor 204 is configured to cooperate with a wearable device (i.e. one paired and communicating with the computing device 200) carried by the user to receive the plurality of use characteristics. For example, the wearable device may generate more accurate motion data, which can be used to error correct the IMU 202.

Also, the processor 204 may be configured to, while rendering the background 207 to comprise the video image from the image sensor 201, and when ambient illumination is less than a threshold, activate the flash device 208 to illuminate the field of view of the image sensor 201. In other words, if the ambient environment is too dark to provide a good view, the processor 204 attempts to mitigate this issue with the flash device 208.

To mitigate battery drain, the processor 204 may be configured to render the background 207 to comprise the video image from the image sensor 201 until a set time period expires. For example, the set time period may comprise 30 seconds. As noted below, if one or more of the plurality of use characteristics indicate the user is using the device during the set time period, the set time period may be extended or simply reset.

In some embodiments, the computing device 200 comprises a temperature sensor generating an operating temperature and coupled to the processor 204. The processor 204 is configured to throttle computational load when the operating temperature exceeds a temperature threshold. In particular, the processor may sequentially perform one or more of the following to throttle computational load as the operating temperature increases: downscaling the video image from the image sensor 201, partitioning the background 207 and only rendering a part of the background, and disabling rendering of the background and returning to the original background (preferably static). For applications where the background 207 is partitioned, the processor 204 is configured to segment the background 207 into first and second sections. The processor 204 is configured to then render only the first section with the video image from the image sensor 201, and maintain the second section as the original image. In some embodiments, the first section is dynamically sized based upon the operating temperature. For example, as the operating temperature decreases, the first section may be increased in size and vice versa.

In some embodiments, the processor 204 is configured to monitor the video image from the image sensor 201 for hazards. When the processor 204 detects a given hazard, for example, obstacles, the processor is configured to cause an output device (e.g. speaker) to generate an alert indication (e.g. sound alarm indication).

Figure 9:
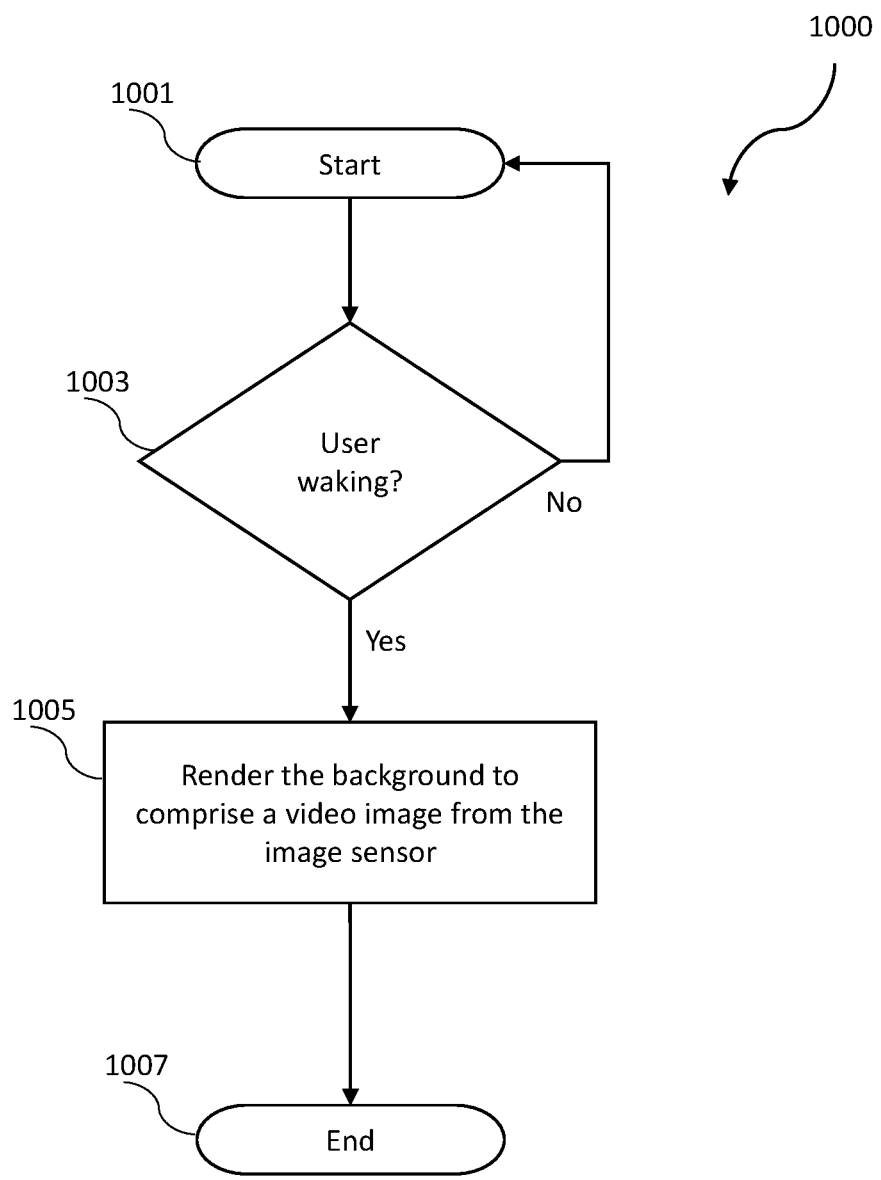
FIG. 9 is a flowchart of a method for operating the computing device of FIG. 6, according to a first example embodiment.

Referring now additionally to FIG. 9, a method of operating a computing device 200 is now described with reference to a flowchart 1000, which begins at Block 1001. The computing device 200 comprises an image sensor 201, an IMU 202, and a display 203. The method illustratively comprises operating a processor 204 coupled to the image sensor 201, the IMU 202, and the display 203, to generate a GUI current screen 206 on the display. The GUI current screen 206 comprises a background 207, and a plurality of foreground GUI elements 210*a*-210*c*, 211*a*-211*i* overlaying the background. The method comprises operating the processor 204 to, when the IMU 202 generates motion data indicative of movement, render the background 207 to comprise a video image from the image sensor 201. (Blocks 1003, 1005). The method ends at Block 1007.

Figure 10:
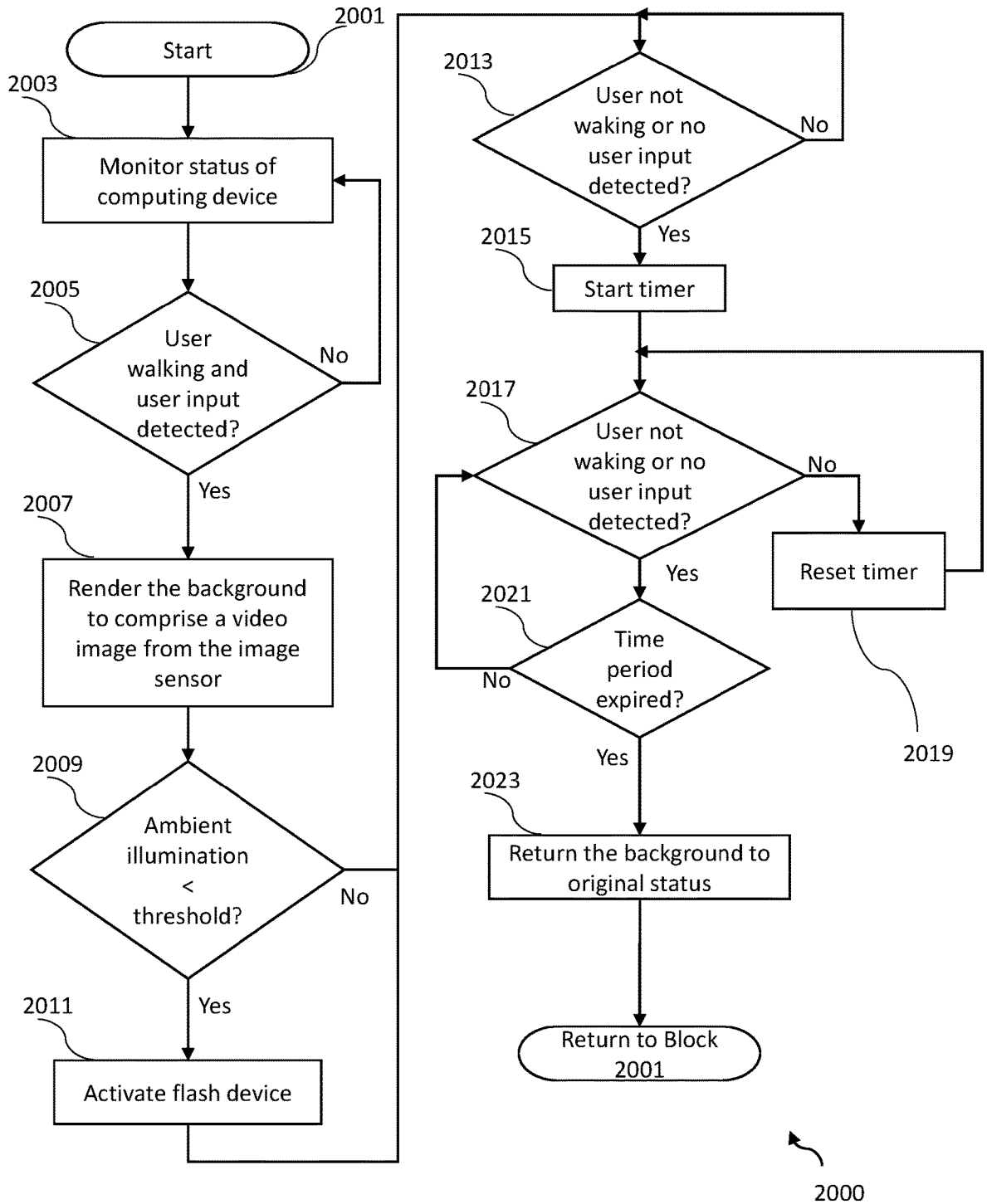
FIG. 10 is a more detailed flowchart of the method for operating the computing device of FIG. 6, according to a second example embodiment.

Referring now to FIG. 10, the method of operating the computing device 200 is now described in greater detail with reference to a flowchart 2000, which begins at Block 2001. At Block 2003, the method illustratively includes monitoring a status of the computing device 200. At Block 2005, the method illustratively comprises monitoring for when both the motion data is indicative of movement, and when user input is detected. If one or both conditions are not satisfied, the method returns to Block 2003. If both conditions are satisfied, the method illustratively includes rendering the background 207 to comprise a video image from the image sensor 201. (Block 2007). If the ambient illumination is below a threshold, the method includes activating the flash device 208. (Blocks 2009, 2011).

At Block 2013, the method includes monitoring the computing device 200 for one or both of motion data being indicative of no movement, and a lack of user input. If satisfied, the method includes starting a timer for the set time period. (Block 2015). If not satisfied, the method maintains a loop, keeping status quo (i.e. the background 207 being replaced by the video image from the image sensor 201). At Block 2017, the method includes monitoring the computing device 200 for one or both of the motion data being indicative of no movement, and a lack of user input. If not satisfied, the method includes resetting the timer at Block 2019. If satisfied, the method includes checking to see if the timer has expired at Block 2021. If the timer has not expired, the method returns to Block 2017. If the timer has expired, the method includes returning the background 207 to the original image at Block 2023, and returning to Block 2001.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A method of operating a computing device comprising: a processor, an image sensor, an inertial measurement unit (IMU), and a touchscreen display;
the processor coupled to the image sensor, the IMU, and the touchscreen display, the processor configured to
generate a graphical user interface (GUI) current screen on the touchscreen display, the GUI current screen comprising a chat application with an opaque background, and a plurality of foreground GUI elements overlaying the opaque background, the foreground elements including textual elements;
in response to the IMU generating motion data indicative of walking or running movement and detecting user input applied through the touchscreen display, replace the opaque background of the chat application with a video image from the image sensor.

2. The method of claim 1 further comprising operating the processor to, when the IMU generates the motion data indicative of movement and when ambient illumination is less than a threshold, activate a flash device in the computing device and render the opaque background to comprise the video image from the image sensor.

3. The method of claim 1 further comprising operating the processor to replace the opaque background of the chat application with the video image from the image sensor until a set time period expires.

4. A computing device comprising:
an image sensor;
an inertial measurement unit (IMU);
a touchscreen display; and
a processor coupled to the image sensor, the IMU, and the touchscreen display, the processor configured to
generate a graphical user interface (GUI) current screen on the touchscreen display, the GUI current screen comprising a chat application with an opaque background, and a plurality of foreground GUI elements overlaying the opaque background, the foreground elements including textual elements, and
in response to the IMU generating motion data indicative of walking or running movement and detecting user input applied through the touchscreen display, replace the opaque background of the chat application with a video image from the image sensor.

5. The computing device of claim 4 further comprising a flash device adjacent the image sensor; and wherein the processor is configured to, when the IMU generates the motion data indicative of movement and when ambient illumination is less than a threshold, activate the flash device and render the opaque background to comprise the video image from the image sensor.

6. The computing device of claim 4 wherein the processor is configured to replace the opaque background of the chat application with the video image from the image sensor until a set time period expires.

7. The computing device of claim 4 further comprising a housing carrying the image sensor, the IMU, the touchscreen display, and the processor; and wherein the image sensor is carried by a major surface of the housing, the major surface being opposite the touchscreen display.

8. The computing device of claim 4 wherein the video image from the image sensor comprises a live video image.

9. A computing device comprising:
an image sensor;
an inertial measurement unit (IMU);
a touchscreen display; and
a processor coupled to the image sensor, the IMU, and the touchscreen display, the processor configured to
generate a graphical user interface (GUI) current screen on the touchscreen display, the GUI current screen comprising a chat application with an opaque background, and a plurality of foreground GUI elements overlaying the opaque background, the foreground elements including textual chat elements, and
in response to the IMU generating motion data indicative of walking movement and detecting user input applied through the touchscreen display, replace the opaque background with a live video image from the image sensor.

10. The computing device of claim 9 further comprising a flash device adjacent the image sensor; and wherein the processor is configured to, when the IMU generates the motion data indicative of at least one walking movement, when the touch user input is detected, and when ambient illumination is less than a threshold, activate the flash device and render the opaque background to comprise the live video image from the image sensor.

11. The computing device of claim 9 wherein the processor is configured to replace the opaque background with the live video image from the image sensor until a set time period expires.

12. The computing device of claim 9 further comprising a housing carrying the image sensor, the IMU, the touchscreen display, and the processor; and wherein the image sensor is carried by a major surface of the housing, the major surface being opposite the touchscreen display.

* * * * *